United States Patent [19]

Ulics

[11] 4,215,898
[45] Aug. 5, 1980

[54] PICK-UP BOX CONSTRUCTION
[75] Inventor: George Ulics, Dearborn, Mich.
[73] Assignee: Ford Motor Company, Dearborn, Mich.
[21] Appl. No.: 15,532
[22] Filed: Feb. 23, 1979
[51] Int. Cl.³ .............................................. B62D 25/20
[52] U.S. Cl. ..................................... 296/183; 108/44; 224/42.43; 410/32
[58] Field of Search ............................ 296/183, 37.16; 224/42.23, 42.42, 42.43, 42.44; 410/32, 34, 144, 156; 108/44; D12/96, 98

[56] References Cited

U.S. PATENT DOCUMENTS

| | | | |
|---|---|---|---|
| D. 222,449 | 10/1971 | Wagoner | D12/96 |
| D. 249,494 | 9/1978 | Lambitz | D12/98 |
| 2,889,097 | 6/1959 | Broehl | 296/37.16 |
| 3,664,704 | 5/1972 | Ellis | 296/183 |
| 3,814,473 | 6/1974 | Lorenzen, Jr. | 296/39 R |
| 4,067,263 | 1/1978 | Naffa et al. | 410/144 |
| 4,094,546 | 6/1978 | Glassmeyer | 296/183 |

*Primary Examiner*—Robert R. Song
*Attorney, Agent, or Firm*—John J. Roethel; Keith L. Zerschling

[57] ABSTRACT

A pick-up truck cargo box capable of transporting standard 4×8 foot construction panels in a flat mode even though the spacing between the wheel housings protruding into the cargo area is less than the width of the panels. The inner body panels 17 of the cargo box 10 are provided with recesses 19 having platform surfaces 21 adapted to support the ends of load bearing support members 25 extending laterally across the cargo area from side wall 12 to side wall 13. The recesses 19 are formed such that when a support member 25 is positioned with its ends on aligned surfaces 21 of the recesses, the top surface 26 of the support member will be at the same elevation as the flat upper surfaces 16 of the wheel housings 14 and 15.

5 Claims, 3 Drawing Figures

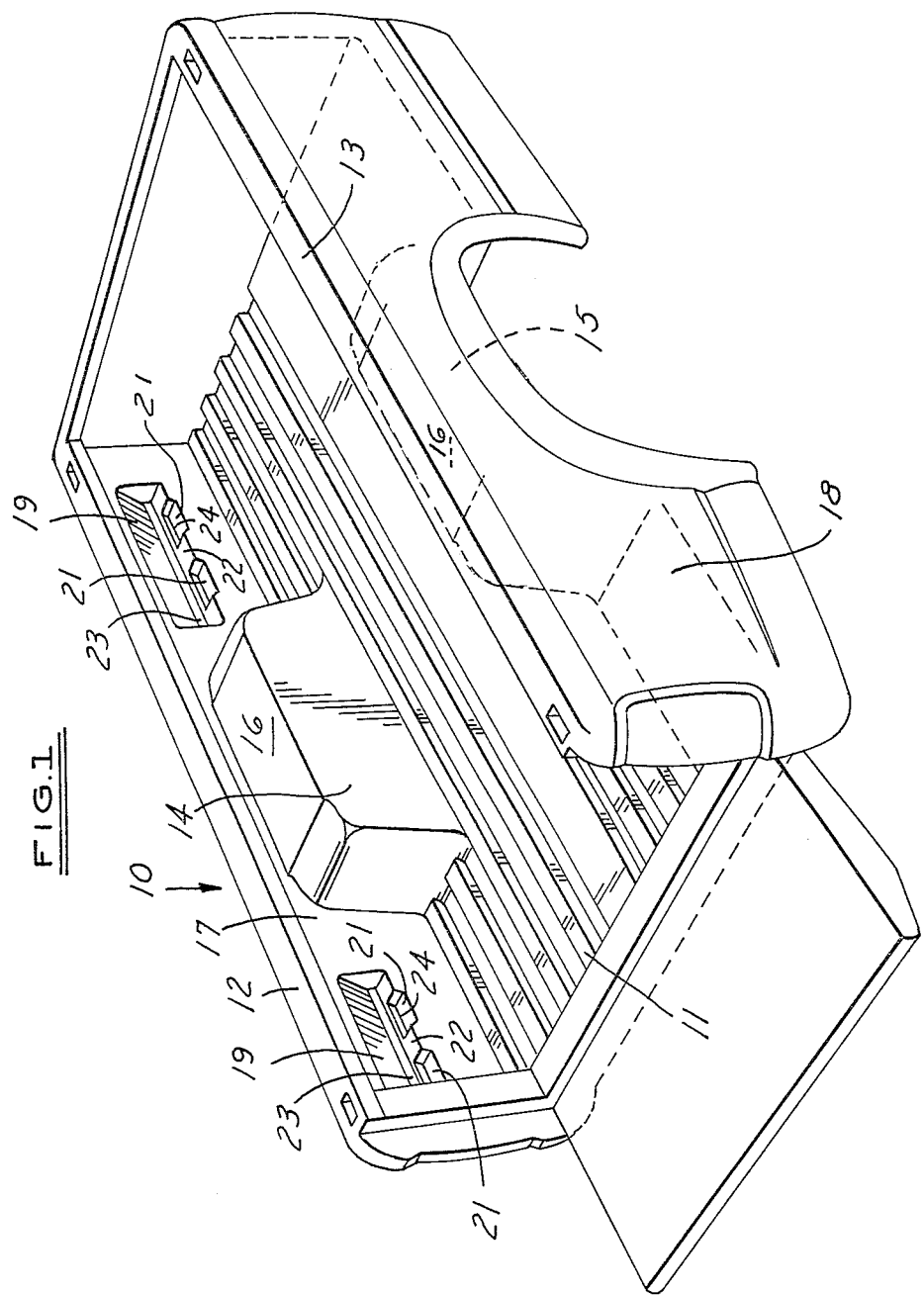

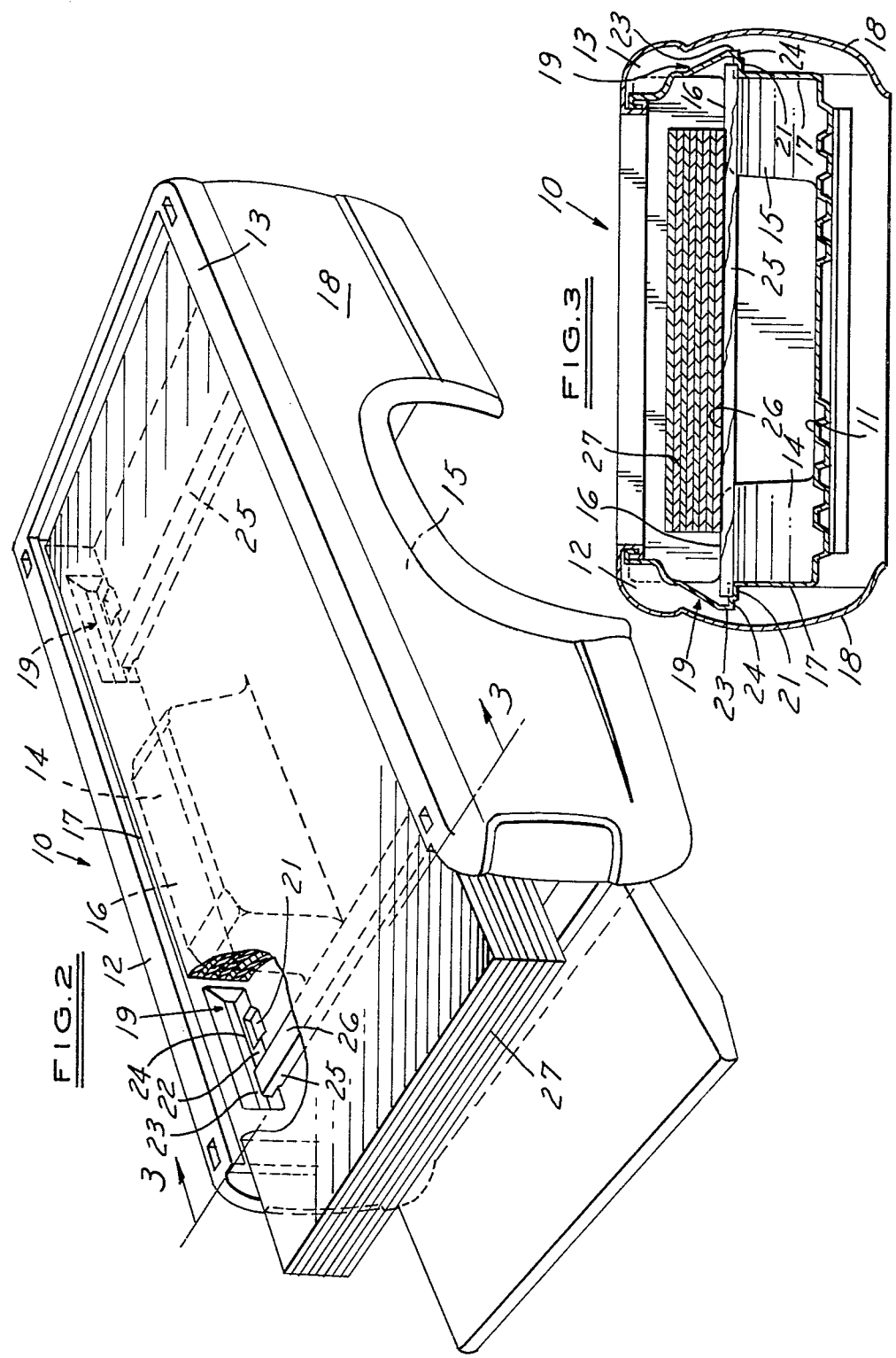

PICK-UP BOX CONSTRUCTION

BACKGROUND OF THE INVENTION

In the construction of homes and commercial and industrial buildings, frequent use is made of drywall panels, floor panels and interior wall finish panels that are available in a standard 4×8 foot size. Often these panels are transported to the job site in pick-up trucks. The conventional pick-up truck has been designed with a cargo box width in which the distance between the wheel housings that protrude into the cargo area is in excess of 48 inches. With the current trend in the downsizing of trucks in the interest of better fuel economy, the wheel house spacing has become less than 48 inches, although the distance between side walls of the cargo box still exceeds this dimension. The result is that it is impossible to carry 4×8 panels in the cargo box with the panels lying flat on the box floor.

It is known in the prior art to provide cargo boxes in which the wheel housings have flat upper surfaces, such as disclosed in U.S. design patent Des. 222,449, issued Oct. 26, 1971, to E. F. Wagoner et al, for a "Wrecker Body". It is also known to provide protective inner liners for the cargo boxes of trucks. The protective liner covers are contoured to cover the original wheel housings and have flat upper surfaces on the false wheel housings. Reference may be made to U.S. Pat. No. 3,814,473, issued June 4, 1974, to G. F. Lorenzen, for a "Protective Inner Liner for Trucks", and to U.S. design patent Des. 249,494, issued Sept. 19, 1978, to R. H. Lambitz et al, for a "Cargo Box Liner for Pick-Up Trucks".

U.S. Pat. No. 2,889,097, issued June 2, 1959, to C.W. Broehl, for an "Automobile Utility Device" is of interest in that it discloses a supporting table adapted to be installed in a station wagon above the level of the rear wheel housing, but it does not suggest the use of the flat upper surfaces of the wheel housings an an element of a support system for carrying articles such as a panel that is 4 feet wide.

SUMMARY OF THE INVENTION

The present invention relates to a pick-up truck having a cargo box that has a floor and side walls extending upwardly from the floor. Protruding into the cargo area at each side wall of the cargo box is a wheel housing having a flat surface at the top thereof. The wheel housings project upwardly from the floor substantially an equal distance.

The improvement comprises a plurality of recesses formed in each side wall of the cargo box, each recess having a platform surface adapted to receive a removeable support member positionable to laterly span the cargo area between the side walls of the cargo box. The vertical height above the floor of the platform surface of each recess is less than the vertical height above the floor of the wheel housing upper surfaces so that the upper surface of each support member will be substantially coplanar with the upper surface of each wheel housing. The support members and the upper surfaces of the wheel housings thus provide a platform on which 4×8 panels may be carried in the cargo box in a flat condition in substantially parallel relationship to the cargo box floor.

DESCRIPTION OF THE DRAWINGS

Other objects, advantages and features of the present invention will become more apparent as the description proceeds, reference being had to the accompanying drawings wherein:

FIG. 1 is a perspective view of the cargo box of a pick-up truck;

FIG. 2 is a view in part similar to FIG. 1 illustrating the cargo box containing a load of panels supported therein in accordance with the present invention; and FIG. 3 is a section view taken substantially on a line 3—3 of FIG. 2, looking in the direction of the arrows.

DETAILED DESCRIPTION OF THE INVENTION

Referring now to the drawings, the pick-up truck cargo box, generally designated 10, embodying the present invention, has a floor 11, side walls 12 and 13 extending upwardly from the floor, and wheel housings 14 and 15 projecting upwardly from the floor and laterally protruding from the side walls into the cargo area of the cargo box 10. The wheel housings 14 and 15 each have at its top a flat surface 16. As best seen in FIG. 3, the side walls 12 and 13 each comprise an inner panel 17 and an outer panel 18 providing a double wall effect.

In a standard, full size, conventional pick-up truck, the distance between the wheel housings within the cargo box is in excess of 48 inches. Thus, it is possible to transport a standard 4×8 construction panel by laying the latter flat on the floor of the cargo box between the wheel housings. The current trend is to downsize the pick-up trucks to decrease truck weight and thereby improve fuel economy. In the downsized trucks, the distance between the wheel housings is substantially less than 48 inches. As a result, the standard 4×8 construction panels cannot be transported by laying them flat on the cargo box floor.

The inside lateral dimension of the downsized cargo box from side wall to side wall is in excess of 48 inches, and it is possible to transport a stack of construction panels by placing them on top of the wheel housings, as best seen in FIG. 2. Since the stack of panels longitudinally overhang the wheel housings, it is necessary to provide some means for stabilizing the ends of the panels so they will not have a tendency to rock in a fore-and-aft direction as the pick-up truck is driven over the rough terrain usually found around construction sites.

In accordance with the present invention, this is accomplished by stamping the inner panels 17 of the cargo box walls with a plurality of recesses 19. Each of the recesses 19 is shown as having two horizontal platform surfaces 21 separated by a raised or divider portion 22. The platform surfaces 21 preferably terminate short of the back wall 23 of the recess in a short step portion 24, for a purpose to be explained. The width of each platform surface 21 is only slightly wider than that of a standard 2×4 inch stud, indicated at 25. The depth of the platform surface is such that when the end of a stud 25, which has a standard thickness of 1½ inch for a 2×4 stud, is placed on a platform surface 21, the upper surface 26 of the stud 25 will lie in a common plane with the flat surfaces 16 on the tops of the wheel housings 14 and 15. The surfaces 16 both lie in a substantially equal distance above the cargo box floor. A step portion 24 may be provided to prevent lateral shifting of the studs 25 and damage to the recess back wall 23 by the ends of the studs.

The recesses 19 are located in the inner panels 17 at each side of the wheel housings. It will be understood that the number of recesses or the number of platform surfaces provided in each recess is not critical as long as there is at least one recess having at least one platform surface at each side of the wheel housing, and as long as every platform surface on one wall is laterally aligned with a platform surface on the other wall so that the studs 25 can be positioned substantially normal to the side walls 12 and 13. With the studs 25 positioned as shown in FIG. 2, a stack of construction panels 27 can be supported at each side near the longitudinal center of the stack on the upper surfaces 16 of the wheel housings and near each end by the studs 25.

If desired, the plane defined by the upper surfaces of the studs 25 and wheel housing flat upper surfaces 16 may be tilted slightly downwardly from the rear toward the front of the cargo box 10. That is, the surfaces of the wheel houses and the recess platfrom surfaces could be formed with a decline toward the front. The purpose would be to resist cargo loss during vehicle acceleration.

Although the recesses 19 have been described as tailored to accommodate 2×4 studs as the support members for the construction panels, since these studs are readily available, it will be understood that any other size stud could have been selected as the base size to be accommodated.

It is to be understood that this invention is not limited to the exact construction illustrated and described above, but that various changes and modifications may be made without departing from the spirit and scope of the invention as defined in the appended claims.

I claim:

1. In a pick-up truck having a cargo box,
   the cargo box having a floor,
   side walls extending upwardly from the floor,
   and wheel housings having flat surfaces at the top thereof,
   the wheel housings projecting upwardly from the floor a substantially equal distance and laterally protruding from the side walls into the cargo area of the cargo box,
   the improvement comprising a plurality of recesses formed in each side wall of the cargo box,
   each recess having a platform surface receiving a removable support member laterally spanning the cargo area between the side walls of the cargo box,
   the vertical height above the floor of the platform surface of each recess being less than the vertical height above the floor of the wheel housing flat surfaces so that the upper surface of each support member will be substantially coplanar with the upper surface of each wheel housing.

2. In a pick-up truck according the claim 1, in which:
   the recesses formed in each side wall of the cargo box are laterally aligned with corresponding recesses in the other side wall.

3. A pick-up truck according to claims 1 or 2, in which:
   the difference in the vertical height between the recess platform surfaces and the wheel house flat surfaces is substantially equal to the vertical thickness of the removable support members.

4. A pick-up truck according to claim 1, in which:
   each recess in a side wall is in lateral alignment with a recess in the other side wall,
   the recesses in each side wall being located on the opposite sides of the contiguous wheel housings.

5. In a pick-up truck according to claim 1, in which:
   the flat surfaces of the wheel housings lie in a substantially common plane,
   the difference in vertical height between the recess platform surfaces and the plane of the wheel house top surfaces being substantially equal to the vertical thickness of the removable support members.

* * * * *